US008708681B2

(12) United States Patent
Voth et al.

(10) Patent No.: US 8,708,681 B2
(45) Date of Patent: Apr. 29, 2014

(54) BLOW-MOULDING MACHINE WITH BLOW MOULD LOCKING IN THE CLEAN ROOM

(75) Inventors: Klaus Voth, Obertraubling (DE); Florian Geltinger, Donaustauf (DE); Michael Neubauer, Regensburg (DE)

(73) Assignee: Krones AG (DE)

( * ) Notice: Subject to any disclaimer, the term of this patent is extended or adjusted under 35 U.S.C. 154(b) by 167 days.

(21) Appl. No.: 13/399,627

(22) Filed: Feb. 17, 2012

(65) Prior Publication Data

US 2012/0225158 A1 Sep. 6, 2012

(30) Foreign Application Priority Data

Mar. 4, 2011 (DE) .......................... 10 2011 013 126

(51) Int. Cl.
*B29C 49/36* (2006.01)
*B29C 49/46* (2006.01)
*B29C 49/56* (2006.01)

(52) U.S. Cl.
USPC .............. 425/73; 425/522; 425/540; 425/541

(58) Field of Classification Search
USPC .................................... 425/73, 522, 540, 541
See application file for complete search history.

(56) References Cited

U.S. PATENT DOCUMENTS

| 4,834,642 A * | 5/1989 | Voss et al. ..................... 425/541 |
| 2007/0190202 A1* | 8/2007 | Mie et al. ..................... 425/541 |
| 2010/0203187 A1 | 8/2010 | Schmid et al. ................ 425/541 |
| 2010/0272844 A1* | 10/2010 | Dordoni ......................... 425/210 |
| 2011/0133369 A1 | 6/2011 | Martini et al. ................ 264/523 |
| 2012/0070522 A1 | 3/2012 | Voth et al. ....................... 425/88 |
| 2012/0091636 A1 | 4/2012 | Voth et al. ..................... 264/535 |
| 2012/0261865 A1* | 10/2012 | Neubauer et al. ............. 425/541 |

FOREIGN PATENT DOCUMENTS

| DE | 102009015519 | 10/2010 | ............. B29C 49/42 |
| EP | 2218569 | 8/2010 | ............. B29C 49/56 |
| EP | 2388129 | 11/2011 | ............. B29C 49/46 |
| WO | WO 2010020529 | 2/2010 | ............... A61L 2/20 |

OTHER PUBLICATIONS

European Search Report issued in corresponding application No. 12157938.7, dated Jun. 25, 2012 (6 pgs).

* cited by examiner

*Primary Examiner* — Robert B Davis
(74) *Attorney, Agent, or Firm* — Hayes Soloway P.C.

(57) ABSTRACT

An apparatus for molding plastic preforms into plastic containers, includes a plurality of molding stations which are arranged on a movable carrier. The molding stations each include blow molds, within which plastic preforms can be molded into plastic containers by applying a flowable medium, as well as blow mold carriers for holding the blow molds, a clean room which at least partially surrounds the individual molding stations, so that the molding stations can be moved within the clean room, and a locking mechanism at least partially located within the clean room, to lock the two blow mold carrier parts together in a closed condition. The locking mechanism includes a first locking element that cooperates with a second locking element, the first locking element being arranged to be movable by a movement device that is supported by at least one bearing that is at least partially provided outside of the clean room.

9 Claims, 6 Drawing Sheets

BLOW-MOULDING MACHINE WITH BLOW MOULD LOCKING IN THE CLEAN ROOM

BACKGROUND OF THE INVENTION

The present invention relates to an apparatus for moulding plastic preforms into plastic containers. Such apparatus have been known from the prior art for a long time and usually include moulding stations arranged on a carrier, in which plastic preforms are respectively moulded into plastic containers by applying pressurised air onto them. In some applications it is necessary for this moulding process to be carried out under sterile conditions. In some countries, there are guidelines for such aseptic treatments. In the USA, for example, such guidelines are drawn up and monitored by the FDA (Food and Drug Administration).

To this end, the machines include sterile rooms in which the moulding process is carried out. Such an aseptic blow-moulding machine is known from WO 2010 020529 A2. In such blow-moulding machines there is the fundamental problem that any gaps and bearing positions within the sterile zones have to be avoided, because they might carry germs that would be shielded from the effect of disinfectants during the sterilisation of the machine (for example by gaseous $H_2O_2$) due to the tight geometry in the respective gap. It would therefore be possible for these germs to cause contamination of the machine and of the containers to be produced.

A blow-moulding machine and in particular a stretch blow-moulding machine usually includes several blowing stations in which the plastic preforms are blown into plastic containers by applying an internal pressure. An important component of a blowing station is here the locking mechanism. This mechanism connects and/or locks the two mould carrier halves during the blowing process. Upon completion of the blowing process, the lock opens and the container can be removed upon opening of the mould and a new plastic preform can be introduced. This locking mechanism usually includes a pivotable element which, upon a pivoting movement, engages in a further element. An actuation of this pivoting element will here usually be carried out via cam levers which are appropriately actuated by a guide cam. Such cam levers, but also the corresponding bearing positions, however, constitute problem zones especially in the case of aseptic applications.

OBJECT OF THE INVENTION

The present invention is therefore based on the object of improving the maintenance of sterility of such blow-moulding machines.

SUMMARY OF THE INVENTION

An apparatus according to the invention for moulding plastic preforms into plastic containers includes a plurality of moulding stations which are arranged on a movable carrier, said moulding stations respectively including blow moulds, within which the plastic preforms can be moulded into plastic containers by way of applying a flowable medium, as well as blow mould holders for holding these blow moulds. The blow mould holders include at least two blow mould carrier parts which are movable relative to each other and which can in particular be pivoted so as to open and close the blow moulds, as well as a clean room that is delimited against an environment by means of at least one wall, which clean room at least partially surrounds the individual moulding stations, so that the moulding stations can be moved within this clean room.

Further, the apparatus includes a locking mechanism (that is preferably positioned at least partially within the clean room) that is used for locking the two blow mould carrier parts together in a closed condition of the blow mould.

According to the invention, the locking mechanism has a first locking element which for locking cooperates with a second locking element, which first locking element is mounted so as to be movable (within the clean room) by means of a movement means and the movement means is supported by at least one bearing means that is at least partially (and preferably completely) mounted outside of the clean room.

Preferably, at least two bearing means and particularly preferably exactly two bearing means are provided for supporting the movement means. Advantageously, these bearing means are designed in such a way that they allow the clean room to be sealed against the environment thereof.

Advantageously, the movement means is an element which is itself movable, with a movement of the first locking element being at least indirectly caused by a movement of this movement means. Particularly preferably, the movement means is a pivot shaft which is particularly preferably mounted to be pivotable about a predefined pivot axis. This pivot axis is here advantageously stationary in relation to the respective blow mould carrier. Moreover, one locking element advantageously engages into the other. Preferably, one locking element engages into the other one for locking purposes. The clean room (hereinafter also referred to as the sterile room) is advantageously completely delimited against an environment (in particular by means of walls).

Advantageously, the movement means or the pivot shaft is not supported on the blow mould carrier, but the bearing means for supporting the movement means is advantageously spaced apart from the blow mould carrier in at least one direction. In this connection, the bearing means may be spaced apart even from the mould carrier in one direction of the pivot shaft, however, it would also be possible for the bearing means to be spaced apart from the mould carrier alternatively or additionally also transversely to this direction of the pivot shaft. It is to be noted that in particular in the case of non-aseptic applications, such a support of the pivot shaft would also be conceivable in areas other than the mould carrier independently from a clean room. The applicant reserves the right to claim protection for such an embodiment.

The blow mould carrier is here in particular provided within the clean room. By means of the arrangement of the bearing means as described above at least partially outside of the clean room it is achieved that a hygiene critical component no longer affects the clean room itself but is disposed outside of the latter. In a further advantageous embodiment, the movable carrier, which is in particular a blowing wheel, supports the pivot shaft.

In a further advantageous embodiment, said carrier is supported so as to be pivotable about a predefined rotary axis. This embodiment of a blow-moulding machine is a carousel-type blow-moulding machine, wherein the moulding stations are transported along a circular path.

Advantageously, at least one locking element is mounted to be pivotable relative to the carrier part.

In a further advantageous embodiment, the pivot shaft is longer in its longitudinal direction than the blow mould carrier part. Advantageously, the pivot shaft is also longer in the longitudinal direction of the pivot shaft than the entire moulding station.

In a further advantageous embodiment, the movement means or the pivot shaft has a section that is located inside of the sterile room and at least one section that is located outside of the sterile room. Advantageously, at least one end section of the pivot shaft and preferably both end sections of the pivot shaft are located outside of the sterile room.

In a further advantageous embodiment, the at least one bearing means and preferably both bearing means are at least partially arranged on the carrier in a pivotable manner.

In a further preferred embodiment, the pivot shaft is sealed relative to the carrier using at least one sealing means. Advantageously, this sealing means is a shaft seal.

Unlike in the prior art, the lock is therefore not supported on the mould carrier. Also, the lock is advantageously not supported on one of the blow moulds. More specifically, in the case of this hygienic design of the assembly, the bearing positions on the mould carrier have been eliminated as far as possible. In the prior art these occurred as a result of the fact that the locking point was (pivotably) supported on a mould carrier. It is advantageously provided within the scope of the invention for the pivot shaft or the locking shaft to be supported on a different component of the machine. On an aseptic blow-moulding machine this is preferably the blowing wheel which is particularly preferably used here at the same time as a load-bearing part. In this way, as mentioned above, the bearing positions are located outside of the clean room and only the central part of the pivot shaft or the movement means is located within the clean room and can lock the mould carriers there. Advantageously, at least one element of the locking mechanism is coupled to the pivot shaft in a rotationally fixed manner and particularly preferably this element is formed integrally with the pivot shaft.

In a further advantageous embodiment, the carrier has a recess on its outer circumference, in which the moulding stations are arranged. Thus, for example, the carrier may have a C-shaped profile, with the moulding stations being arranged within this C-shaped profile. In this connection, the ends of this C-shaped profile (which are advantageously designed in a flange-type manner) may be used to receive the pivot shaft.

In a further advantageous embodiment, at least one locking element has at least one hole-type recess and the other locking element has at least one protrusion which in a locked condition engages in this hole-type recess. It would be possible for one of the locking elements to have a flat plate-shaped design and for the locking shaft or a component of the locking shaft to engage in said hole-type recesses of this plate-shaped counter-piece. However, it would also be possible for the plate-shaped piece to be arranged on the pivot shaft in a rotationally fixed manner and to engage in corresponding protrusions of the second locking element. Preferably, the second locking element is mounted on a or the blow mould carrier part that is pivotable relative to the carrier.

In this way, only a tensile load will occur in a locked condition.

In a further advantageous embodiment, a blow mould carrier part is mounted to be fixed relative to the carrier. This means that for opening and closing only one of the two blow mould carrier parts will be moved, in particular pivoted, relative to the carrier.

In a further advantageous embodiment, the apparatus has an actuating element for actuating the first locking element, and this actuating element is mounted outside of the clean room. This element may for example be a cam lever that is mounted outside of this clean room and is moved by means of a guide cam. This guide cam is particularly preferably a stationary cam that is advantageously also provided outside of the clean room. Advantageously, the above-mentioned pivot shaft or locking shaft will be directly driven without any redirection. However, it would also be possible for a motorised, hydraulic and/or pneumatic drive to move said pivot shaft or movement means to be provided.

BRIEF DESCRIPTION OF THE DRAWINGS

Further advantages and embodiments will become evident from the attached drawings, wherein.

DETAILED DESCRIPTION OF THE INVENTION

Figure 1:
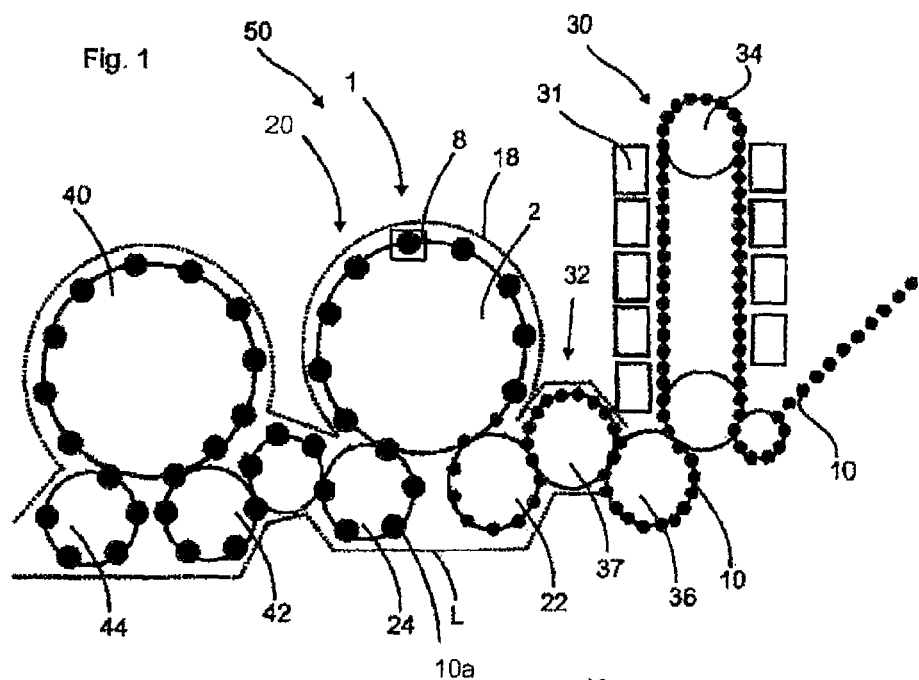
FIG. 1 shows a schematic view of a system for producing plastic containers.

FIG. 1 shows a schematic view of a system for producing plastic containers. This system 50 includes a heating unit 30 in which plastic preforms 10 are heated. These plastic preforms 10 are here guided through this heating unit 30 by means of a transport unit 34 such as an endless chain and are heated in this process by a plurality of heating elements 31. This heating unit 30 is immediately followed by a transfer unit 36 which transfers the preforms 10 to a sterilisation unit 32. This sterilisation unit 32 also has a transport wheel 37 and sterilisation elements may be arranged on this transport wheel 37 or may be provided to be stationary. In this area, for example, sterilisation by means of hydrogen peroxide gas or by means of electromagnetic radiation is possible. In particular, internal sterilisation of the preforms is carried out in this area.

Reference numeral 20 identifies in its entirety a clean room, the external boundaries of which are indicated here by a dotted line L. In a further preferred embodiment, the clean room 20 is not only provided in the area of the transport wheel 2 and the filling unit 40, but may begin as early as in the area of the heating unit 30, the sterilisation unit 32, the plastic preform infeed and/or the plastic preform production. It can be seen that this clean room 20 begins in the area of the sterilisation unit 32. In this area, sluice units may be provided in order to introduce the plastic preforms into the clean room 20 without too much gas flowing within the clean room and thus getting lost.

The clean room is, as indicated by the dashed line L, adapted to the exterior contour of the individual system components. In this way, the volume of the clean room can be reduced.

Reference numeral 1 identifies in its entirety a moulding apparatus wherein a plurality of blowing stations or moulding stations 8 are arranged on a transport wheel 2, but only one of these blowing stations 8 is shown herein. These blowing stations 8 are used to expand the plastic preforms 10 into containers 10a. Although not shown here in detail, not the entire area of the transport unit 2 is located within the clean room 20, but the clean room 20 or isolator is realised to a certain extent as a mini isolator within the entire apparatus. It would thus be possible for the clean room to be implemented in a channel-type manner at least in the area of the moulding apparatus 1.

Reference numeral 22 relates to an infeed unit which transfers the preforms onto the moulding unit 1, and reference numeral 24 relates to a discharge unit that discharges the plastic containers 20 produced from the moulding apparatus 1. It can be seen that the clean room 20 has recesses in the areas of the infeed unit 22 and the discharge unit 24, respectively, which recesses accommodate these units 22, 24. In this way, a transfer of the plastic preforms 10 to the moulding apparatus 1 or a takeover of the plastic containers 10a from the moulding apparatus 1 can be achieved in a particularly advantageous manner.

The expanded plastic containers are transferred by a transfer unit 42 to a filling unit 40 and are subsequently discharged by this filling unit 40 via a further transport unit 44. In this context, also the filling unit 40 is located within said clean room 20. It would be possible also in the case of the filling unit that not the entire filling unit 40, which may for example have a reservoir for a beverage, is completely arranged within the clean room 6, but again only those areas in which the containers are actually guided. Insofar, the filling unit could also be designed in a similar manner as the apparatus 1 for moulding plastic preforms 10.

As mentioned, in the region of apparatus 1, the clean room 20 is reduced to an area as small as possible, i.e. substantially down to the blowing stations 8 themselves. As a result of this compact design of the clean room 20, the very production of the clean room becomes easier and quicker and it is also less complex to keep it sterile during operation. Also the amount of sterile air needed is reduced, so that the size of the filter systems can be reduced, and also the risk of uncontrolled vortexes forming is reduced.

Figure 2:
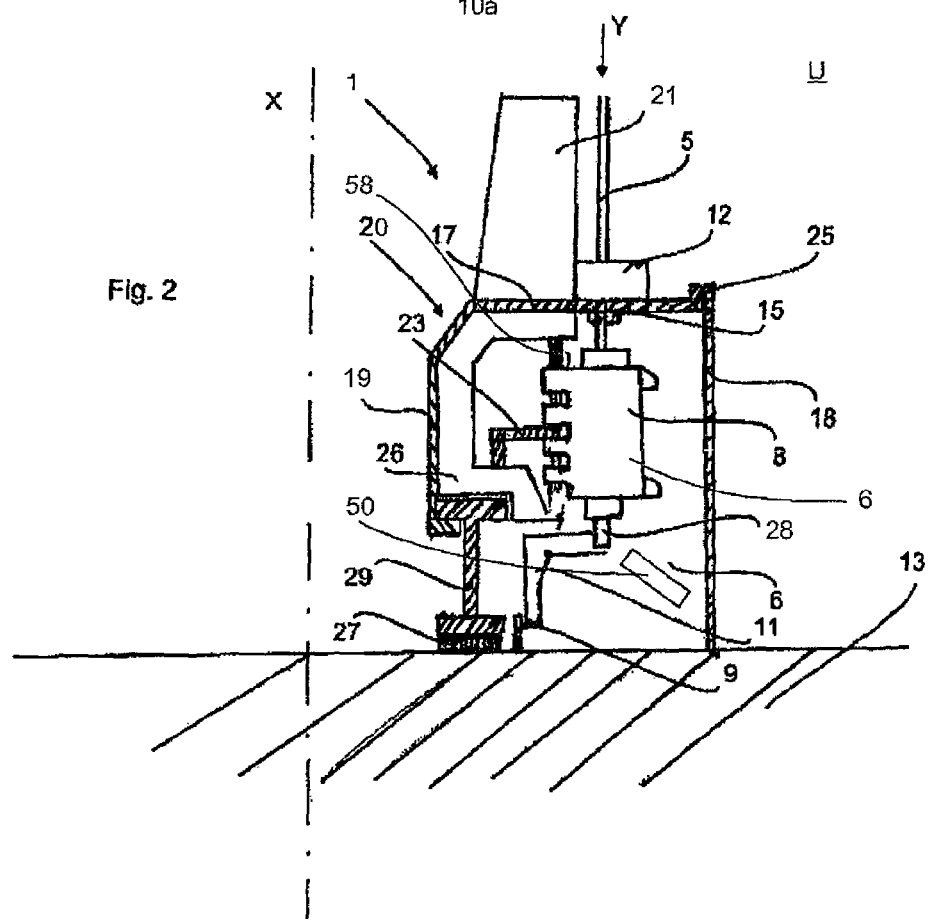
FIG. 2 shows a view of a clean room in the area of a blowing station.

FIG. 2 shows a detailed view of the apparatus 1 in the area of a blowing station 8. A plurality of such blowing stations 8 is moved by a transport unit 2 or a carrier in a rotary manner about an axis X. As can be seen in FIG. 2, the blowing station 8 is guided within the clean room, which is here formed like a channel. This clean room 20 is completed by a movable lateral wall 19 and a cover 17 that is formed integrally with this lateral wall 16. This lateral wall 19 and the cover 17 rotate here together with the blowing station 8.

Reference numeral 18 relates to a further wall which delimits the clean room 16. This wall 18 is here an external wall that is provided to be stationary. Between the cover 17 and the wall 18, a sealing unit 25 is provided, which seals the elements 17 and 18, which are movable relative to each other, against each other for example using a surge tank, as mentioned above. The bottom area of the wall 18 is mounted to be stationary and in a sealing manner on a base 13. Within the clean room 20 and here resting directly on the wall 19, a carrier 26 is provided which also moves in a rotary manner and on which in turn a holding unit 23 is provided, which holds the blowing station 8.

Reference numeral 11 relates to a follower unit that can be actuated by a guide cam 9 in order to open and close the blowing station on its way through the clean room 6, in particular so as to insert the plastic preform into the blowing station and to remove it again therefrom. A guide cam 9 is also provided within the clean room 20. However, it would for example also be possible to lead a section 11 out of the clean room 20 as early as below the individual blowing station 8.

The transport unit 2 may include still further elements which are arranged above the clean room 20.

The carrier 26 is here fixedly mounted on a holding body 29 and this holding body is in turn movable relative to the base 13. Reference numeral 27 relates here to a further sealing unit that seals the areas 13 and 29 that are movable relative to each other also in this area.

Reference numeral 5 relates to a stretching rod that is movable relative to the blowing stations, in order to stretch the plastic preforms 10 in the longitudinal direction thereof. A slide 12 is provided here on the cover 17, opposite of which the stretching rod is movable in the direction Y. Reference numeral 21 relates to a further bracket for this slide 12 of the stretching rod 5.

It can be seen that during the blow-moulding process, certain areas of the stretching rod are located both outside of the clean room 20 and inside of the clean room 20. To this end it is possible to provide protection means such as bellows outside of the clean room 20 or above the slide 12, which bellows surround the stretching rod 5, so that no area of the stretching rod 5 will come into direct contact with the external environment. Reference sign U identifies the (non-sterile) environment of the clean room 20. Reference numeral 28 identifies a carrier for supporting a bottom mould, which also forms a component of the blow mould 4. This carrier can here also be moved in the direction Y.

Reference numeral 50 relates to a sterilisation unit that is here preferably provided inside the clean room 20 and is used for sterilising the individual moulding stations or components of these moulding stations 8. This sterilisation unit 55 may here apply for example hydrogen peroxide or another sterilisation agent onto the moulding stations 8. The sterilisation unit 55 may be mounted to be stationary and the moulding stations can move relative to this sterilisation unit 55. This sterilisation unit or application unit 55 may be located on the transport wheel 2 or on the stationary wall 18 or may be arranged to be generally stationary and may consist of nozzles or the like. Moreover, it is advantageous to introduce sterile air into the clean room 20 for sterilising the clean room 20 via the ventilation system.

The blow moulds (not shown) are located within the blow mould carrier 6. More specifically, two blow mould carrier parts may be provided here which are pivotable relative to each other and respectively hold one blow mould part. By way of this pivoting process, the blow moulds can be opened in order to insert plastic preforms and to remove finish-blown containers. These blow mould carriers and blow moulds are here also provided within the clean room.

However, it would also be possible and preferred (contrary to what is shown in FIG. 2) for the transport unit 2 or the carrier to have a C-shaped outer perimeter, which also forms part of the outside walls of the clean room. Thus, this C-shaped clean room wall rotates here together with a transport unit 2, i.e. the blowing wheel. In this embodiment, the bottom boundary of the clean room is spaced apart from the base 13 and moves relative to the base. In this way, the clean room can be designed to be even smaller than shown in FIG. 2. Sealing of this C-shaped profile of the transport unit, which forms here both an inner wall and a bottom and top cover of the clean room, is here preferably carried out only relative to the outside wall of the clean room. This outside wall is here advantageously arranged to be stationary.

Figure 3:
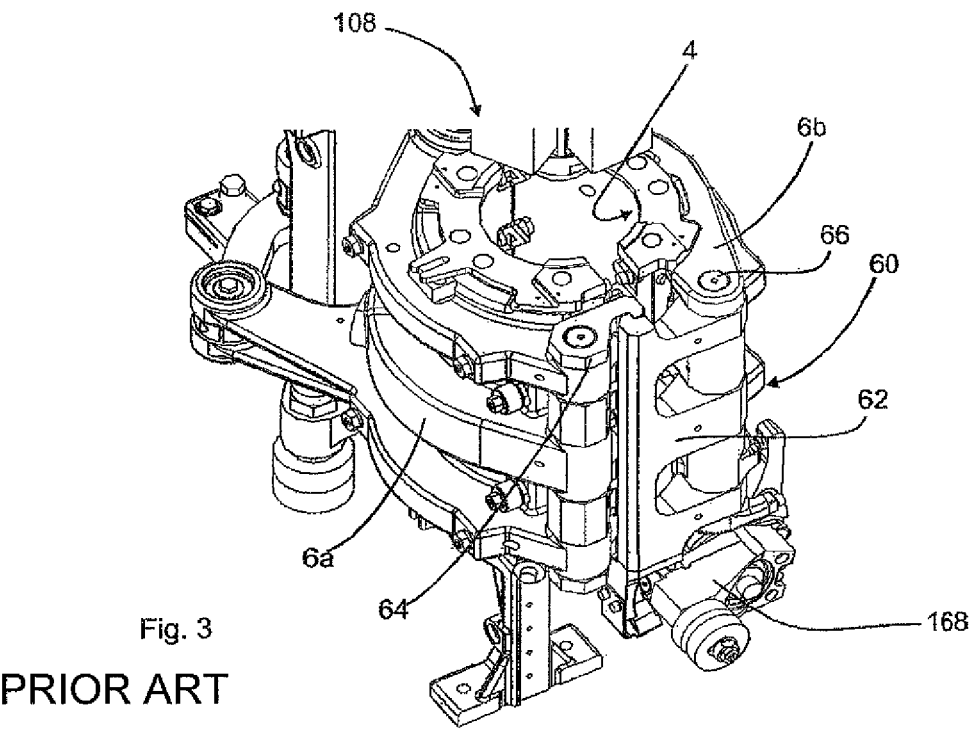
FIG. 3 shows a view of a moulding station according to the prior art having a lock.

FIG. 3 shows a moulding station 108 according to the applicant's internal prior art. This moulding station 108 has here a first blow-mould carrier part 6a and a second blow-mould carrier part 6b, which are pivotable relative to each other, in order to open or close the moulding station 108 in this way. On these blow mould carrier parts 6a and 6b, a blow mould 4 or corresponding blow mould halves are arranged. Reference numeral 168 relates to an arm that is provided on the blow mould carrier part 6a and is coupled with an actuating mechanism in order to open or close the blow mould carrier parts.

A corresponding guide cam for driving the opening and closing mechanism is here advantageously provided outside of the clean room. Further, the moulding station has a locking mechanism which is identified in its entirety with 60. This locking mechanism is used for locking the blow mould carrier parts and thus also the blow moulds during the actual expansion process. The locking mechanism 60 has here a pivot shaft 66, via which a first locking element 62 is provided on the blow mould carrier part 6b so as to be pivotable. A second locking element is provided on the first blow mould carrier part 6a.

The locking shaft is thus supported in one of the two mould carriers. A plurality of bearing positions spread over the level of this mould carrier are provided in order to ensure an even force distribution in the components. It is therefore necessary for the lock to be able to receive a holding force of several 10,000 kN. The locking process consists in a rotary movement of the lock. This movement is generated by a stationary cam fixed to the basic structure of the machine and is transmitted to the locking shaft 66 via a plurality of re-directions.

Figure 4:
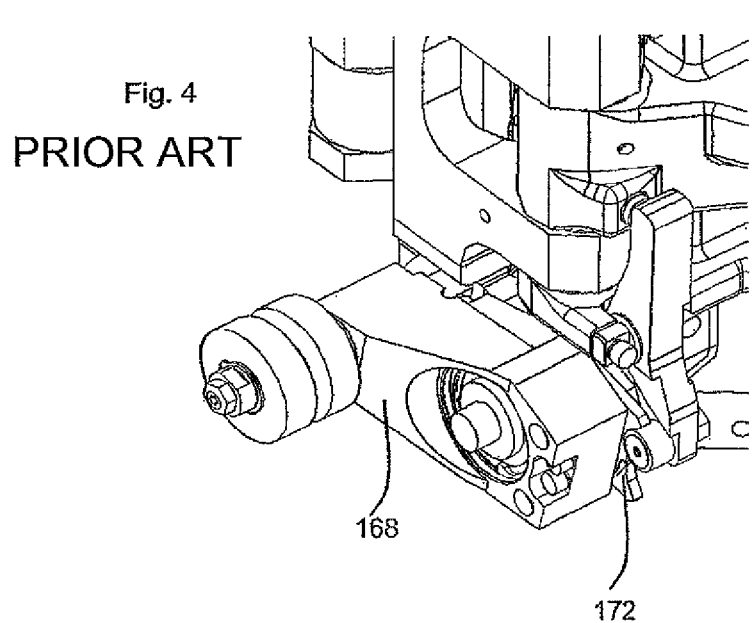
FIG. 4 shows a partial view of the apparatus shown in FIG. 3.

FIG. 4 shows a partial view of the actuating mechanism 168. Reference numeral 172 identifies latching means used to ensure that the locking mechanism 60 can latch into a locked position during operation and can, if necessary, also be pushed into the locked position.

Figure 5:
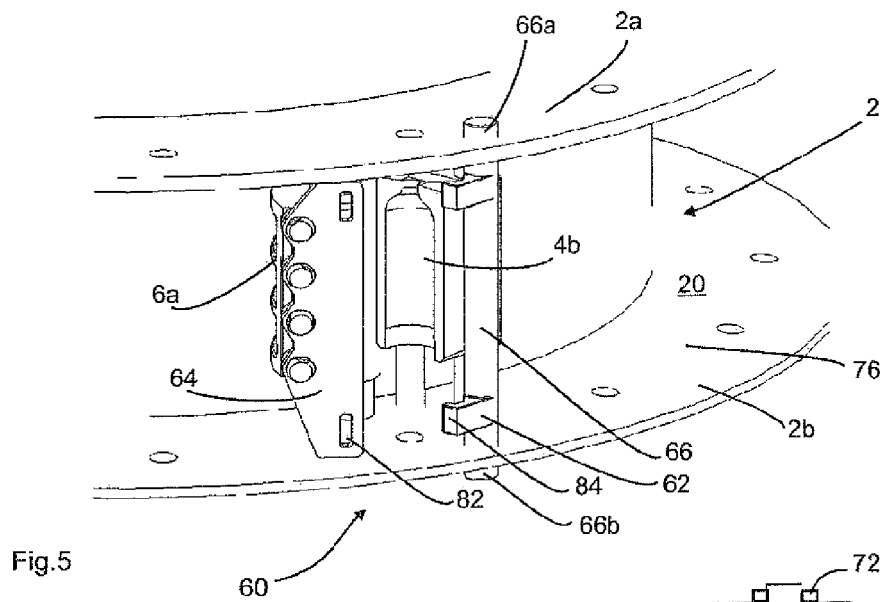
FIG. 5 shows a view of an apparatus according to the invention.

FIG. 5 shows a view of an embodiment according to the invention. In this design it can be seen that the pivot shaft or the locking shaft 66, which is used for pivoting the engagement element 62 and which is here formed integrally with the engagement element, extends through two flanges 2a and 2b which are here components of the carrier 2. In this way it is possible to take the support of the locking shaft 66 out of the clean room 20. Preferably, a locking element is fixedly (if necessary, however, detachably) provided on the pivot shaft or the locking shaft. The carrier 2 has here a C-shaped profile on its outer perimeter and the moulding stations 8 are arranged within the recess 76 of this C-shaped profile. Within this recess, also the clean room 20 is advantageously located. Reference numeral 60 relates to the locking mechanism in its entirety.

Reference numeral 84 identifies a protrusion which for locking engages in a corresponding hole or a recess 82. This protrusion is part of the locking element 62. Thus, in the embodiment shown in FIG. 5, the locking shaft is supported on another component of the machine than the mould carrier 6b. The aseptic blow-moulding machine shown in FIG. 5 is, as shown in FIG. 5, preferably the blowing wheel which is here used at the same time as a load-bearing part. Thus, as mentioned, the bearing positions are provided outside of the clean room. Only the central part of the locking shaft 66 is located within the clean room and can lock the mould carriers there. Reference numerals 66a and 66b thus relate to the respective end sections of the locking shaft which protrude from the clean room.

Figure 6:
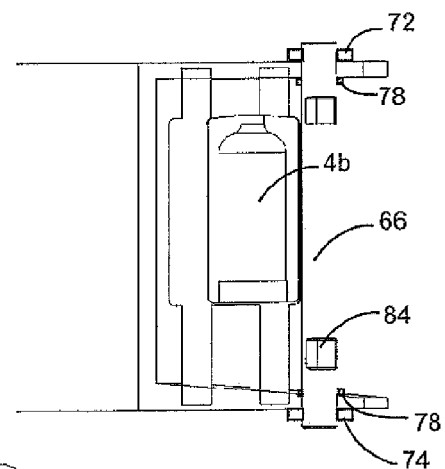
FIG. 6 shows a lateral view of the apparatus shown in FIG. 5.

FIG. 6 shows a lateral view of the embodiment shown in FIG. 5. What can here further be seen are sealing units 78, such as for example shaft seals, which seal the shaft against the clean room. The bearing positions are here provided above the upper sealing unit 78 or below the sealing unit 78 and are therefore no longer located in the clean room.

Reference numerals 72 and 74 therefore identify, very schematically, support units for supporting the pivot shaft 66. The support means 72, 74 may here be integrated directly in the respective flanges 2a, 2b or in the carrier 2.

These bearing means may for example be slide bearings, roller bearings or hydrostatic bearings.

Figure 7:
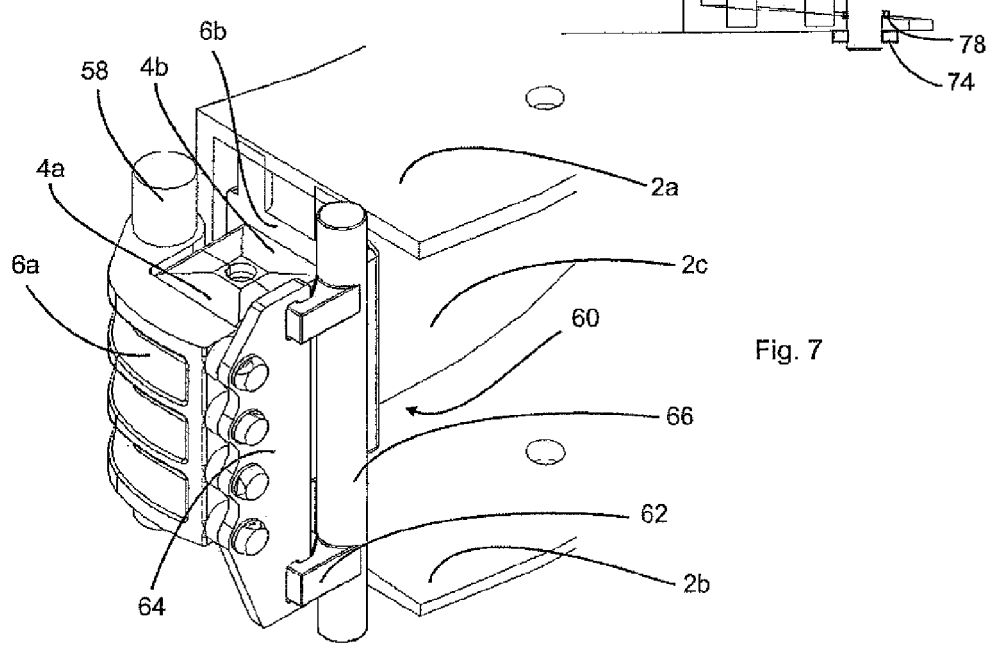
FIG. 7 shows a further view of the apparatus shown in FIG. 5.

FIG. 7 shows a further embodiment of an apparatus according to the invention, this time in a closed position. This means that the pivot shaft or the locking shaft 66 has been rotated such that the protrusions 84 respectively engage in the recesses 82 shown in FIG. 5. What can be seen here as well are the blow mould parts 4a and 4b on which the respective mould carrier parts 6a and 6b are provided. Reference numeral 64 again identifies the locking element in which the first locking element 62 engages. Reference numeral 58 identifies a pivot shaft that is used for folding the blow mould carrier 6a, 6b open. Also a support for this shaft may be located outside of the clean room.

Figure 8:
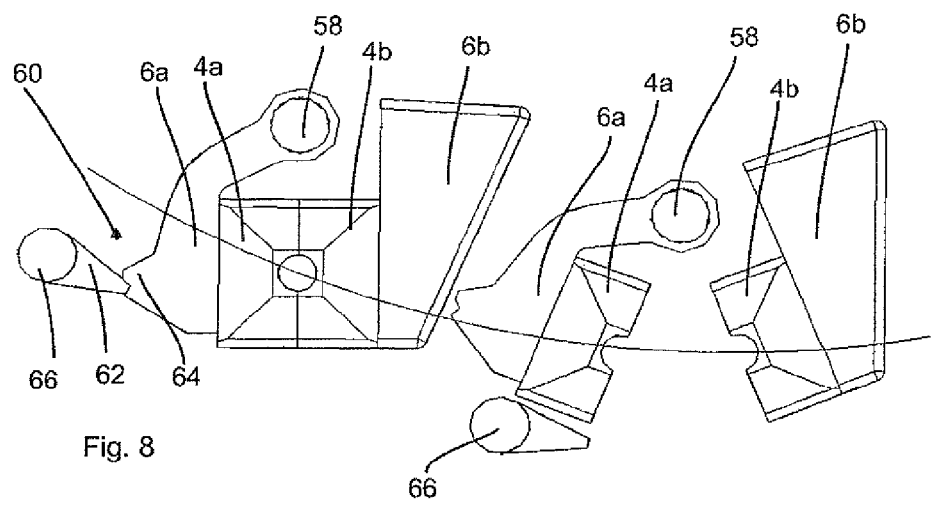
FIG. 8 shows a further embodiment of an apparatus according to the invention.

FIG. 8 shows a further embodiment of an apparatus according to the invention, and here on the one hand an open condition of the blow mould (right-hand part of the figure) and a closed condition of the blow mould are illustrated. In this embodiment, the locking shaft 66 is here provided behind the movable blow mould carrier 6a. It can be seen that only the mould carrier 6a can be pivoted about the shaft 58 and is folded onto the mould carrier 6b. Upon closing the mould carrier half (cf. left-hand part of the figure), the locking shaft 66 is rotated by a certain amount in the counter-clockwise direction. In this way, the first locking element 62 engages in the second locking element 64 and thus arrests the blow mould parts 4a and 4b in the closed condition. In this embodiment it is possible for the movable mould carrier 6a to be designed to be less bulky because the force resulting from the blowing pressure is largely introduced directly into the locking shaft 66. In this embodiment, too, the end sections of the locking shaft 66 may be guided out of the clean room or the support means may be located outside of the clean room.

Figure 9:
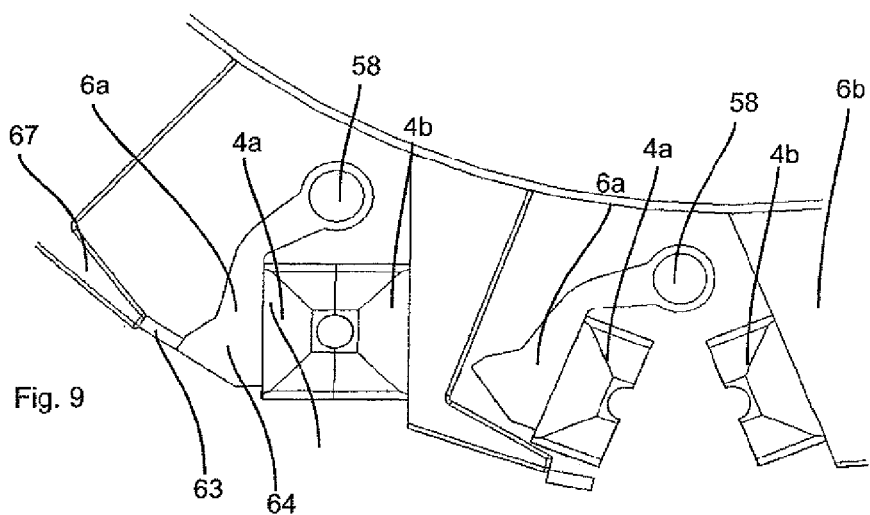
FIG. 9 shows a further embodiment of an apparatus according to the invention.
Figure 10:
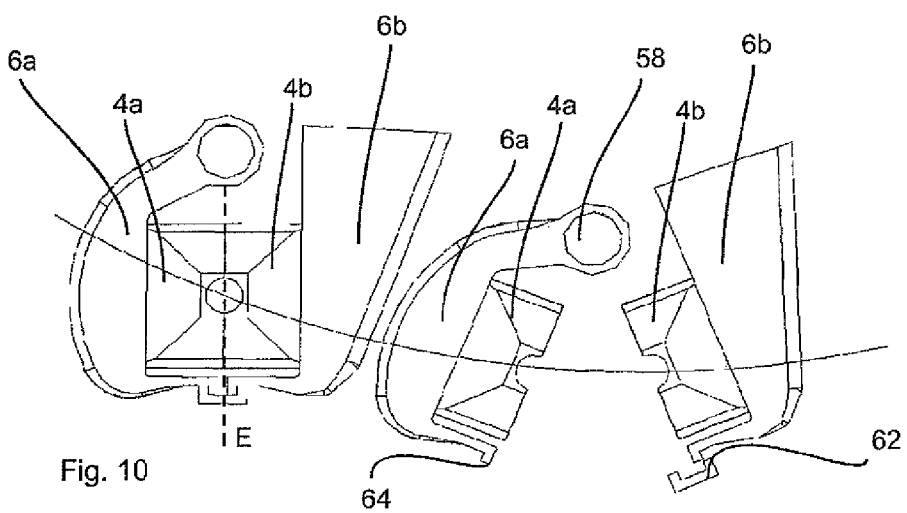
FIG. 10 shows a further embodiment of a locking mechanism.

It is also noted that in particular the embodiment shown in FIG. 3 can also be used independently from an aseptic embodiment or independently from the presence of a clean room. This means that in the case of the embodiments shown in FIGS. 8 to 10, the bearing positions do not necessarily have to be positioned outside of a clean room. Also non-aseptic applications would be conceivable in which there is no clean room in which the containers or blow moulds are transported. In any case, however, the locking shaft is spaced apart from the blow mould carrier, more specifically in a direction that is vertical to the direction of extension of the locking shaft. In FIGS. 8 to 10, this direction is respectively vertical to the figure plane.

FIG. 9 shows a further embodiment of a blow mould lock according to the invention. However, in this embodiment the first locking element 63 does not carry out a rotational but preferably a translational movement. A bar or a pad 63, which here forms the first locking element 63, is displaced upon closing the mould carrier and thereby locks the latter. However, it would also be possible for the bar or the pad 63 to be pivoted by way of a rotation into the locking position. In the embodiment shown in FIG. 9, the bearing positions used for moving the first locking element 63 are provided outside of a clean room. However, it would also be possible here that no clean room is provided and only the respective locking element 63 is spaced apart from the blow mould carrier at least in the opening position. In this embodiment, the lock is therefore not supported on one of the blow mould carriers and is preferably not supported on one of the blow moulds either. Reference numeral 67 identifies a support body for supporting the pad. Also the further embodiments shown are, as mentioned above, conceivable without a clean room, i.e. not in an application that involves an aseptic machine.

Further, in these embodiments, the locking element 62 is preferably pressure loaded, as can be seen in particular in FIGS. 8 and 9.

Advantageously here, the locking element is located in an area of the force resulting from the blowing pressure.

As shown, a rotational and/or translational movement of the locking element 62 is possible here.

FIG. 10 shows a further embodiment of an apparatus according to the invention. In this embodiment, locking is carried out by a translational movement of the first locking element 62. This has here a C-shaped cross-section and connects the stationary mould carrier half for locking with the movable one. In this way, a closed force flux is achieved between the two mould carrier halves 6a and 6b.

Further, preferably in particular with this embodiment, the first locking element 62 is located in the area of a separation plane between the two blow mould parts 4a and 4b. The separation plane is here illustrated by a dashed line marked with the reference sign E.

Figure 11:
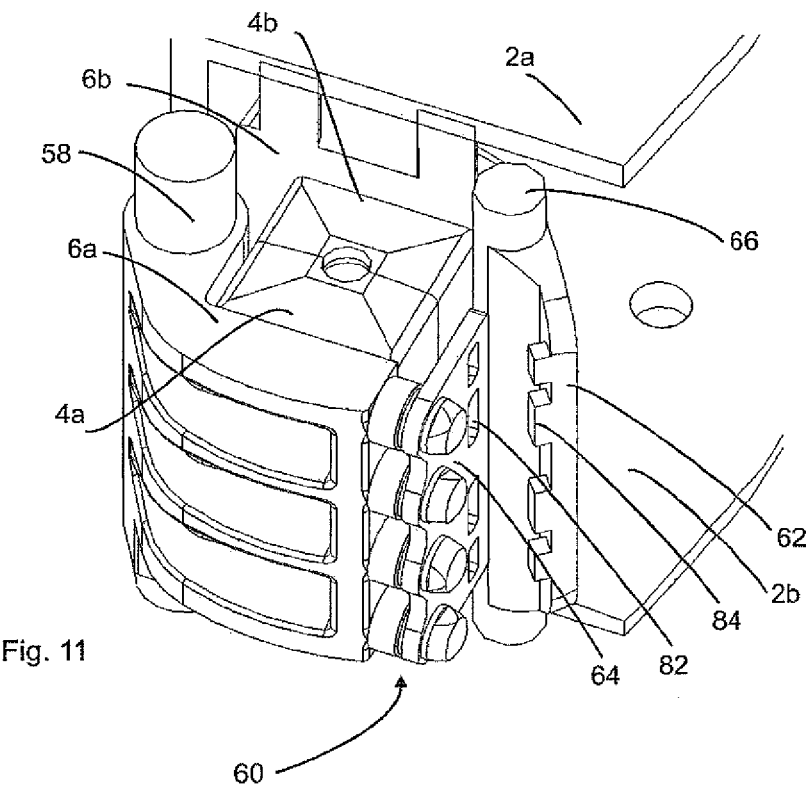
FIG. 11 shows a further partial view of a locking mechanism.

FIG. 11 shows a further embodiment of a locking mechanism 60. Here, the second locking element 64 is implemented as a locking tab with a planar or flat design. The locking shaft 66 engages in this locking tab or the second locking element 64 via protrusions 84. As a result, substantially exclusively tensile stresses act on the locking tab or the second locking element 64. No torque or force as in the case of conventional hook locks is generated.

Figure 12:
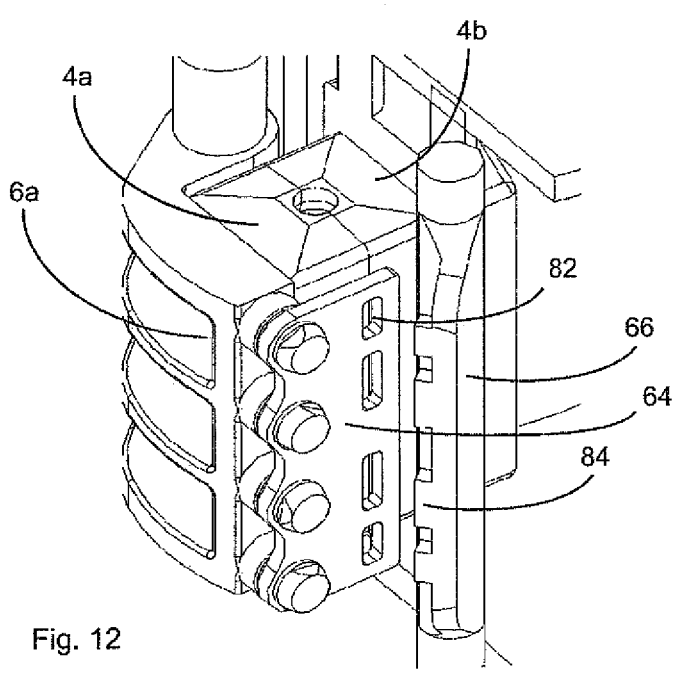
FIG. 12 shows a further view of the locking mechanism shown in FIG. 11.

FIG. 12 also illustrates this condition, however from a different perspective. It can be seen here that a plurality of protrusions 84 is provided, which in a locked condition respectively engage in holes 82 matched to these protrusions.

Figure 13:
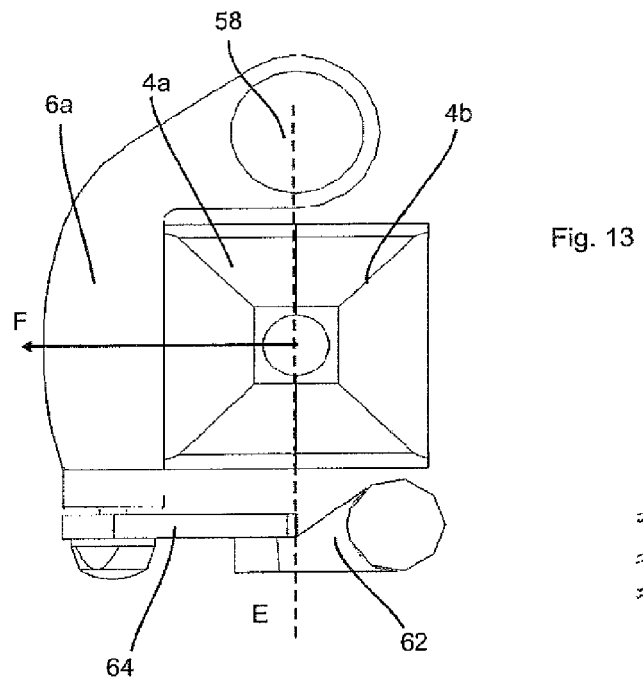
FIG. 13 shows a top view of the locking mechanism shown in FIG. 12.

FIG. 13 shows a further illustration of this situation. What can be seen here is a force F that results from the blowing pressure. Here, almost exclusively tensile stresses act on the implemented flat locking tab or the second locking element 64.

Figure 14:
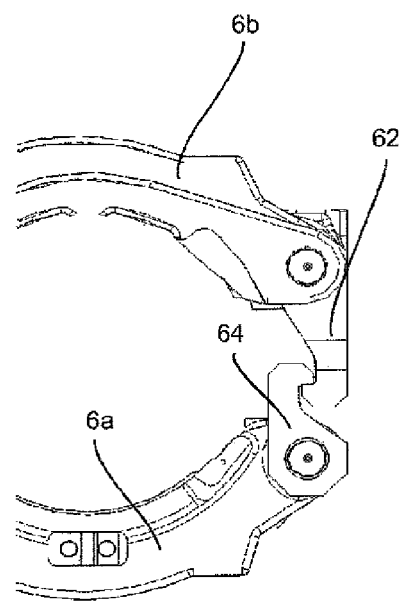
FIG. 14 shows a view of a locking mechanism according to the prior art.

By contrast, FIG. 14 shows an apparatus according to the prior art. What can be seen here is a hook lock between the two locking elements 62 and 64. In this case, in particular also forces other than the forces that apply exclusively tensile stresses on the locking tab occur, i.e. forces that could bend these hook locks 62 and 64.

Figure 15:
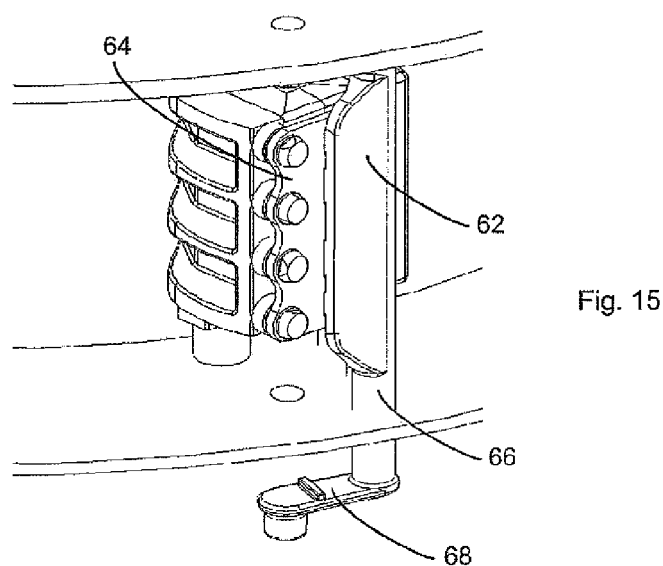
FIG. 15 shows a view of a locking mechanism with an actuating element.

FIG. 15 shows a further view that is similar to the view already shown above. What can be additionally seen here is an actuating element 68 that is used for pivoting the pivot shaft 66. Here, the locking shaft 66 can be actuated by the actuating element 68 directly and without any re-directions or the like. A corresponding guide cam (not shown) can be connected to the base frame and may be located outside of the clean room 20. In the case of a rotation of the carousel, the pivot movement of the locking shaft 66 is generated in this way.

The applicant reserves the right to claim all of the features disclosed in the application documents as being essential to the invention in as far as they are novel over the prior art either individually or in combination.

| | List of reference numerals |
|---|---|
| 1 | Moulding apparatus |
| 2 | Carrier, transport unit |
| 4 | Blow mould |
| 4a, b | Blow mould part |
| 5 | Stretching rod |
| 6 | Blow mould carrier |
| 6a, 6b | Blow mould carrier part |
| 8 | Blowing station, moulding station |
| 9 | Guide cam |
| 10 | Plastic preforms |
| 10a | Container |
| 11 | Follower unit |
| 12 | Slide |
| 13 | Base |
| 17 | Cover |
| 18 | Wall |
| 19 | Lateral wall, section |
| 20 | Clean room |
| 22 | Infeed unit |
| 23 | Holding unit |
| 24 | Discharge unit |
| 25 | Sealing unit |
| 26 | Carrier |
| 27 | Sealing unit |
| 28 | Carrier (for bottom mould) |
| 29 | Holding body |
| 30 | Heating unit |
| 31 | Heating elements |
| 32 | Sterilisation unit |
| 36 | Transfer unit |
| 37 | Transport wheel |
| 40 | Filling unit |
| 42 | Transfer unit |
| 44 | Transport unit |
| 50 | Sterilisation unit |
| 58 | Pivot shaft (for opening and closing the blow mould) |
| 60 | Locking mechanism |
| 62 | First locking element |
| 63 | First locking element, pad |
| 64 | Second locking element |
| 66 | Movement means, pivot shaft |
| 66a, 66b | End sections of the pivot shaft 66 |
| 67 | Support body |
| 68 | Actuating element |
| 72, 74 | Bearing means |
| 76 | Recess |
| 78 | Sealing unit |
| 84 | Protrusion |
| 82 | Recess |
| 108 | Moulding station (StdT) |
| 182 | Arm (StdT) |
| 172 | Latching means (StdT) |
| U | Environment |
| F | Force |
| L | Line |
| X | Axis |
| Y | Direction |

The invention claimed is:

1. An apparatus for moulding plastic preforms into plastic containers, comprising a plurality of moulding stations which are arranged on a movable carrier, said moulding stations each including blow moulds, within which the plastic preforms can be moulded into plastic containers by applying a flowable medium, as well as blow mould carriers for holding these blow moulds, and wherein the blow mould carriers include at least two blow mould carrier parts for opening and closing the blow moulds, which blow mould carrier parts are movable relative to each other, comprising a clean room delimited against an environment using at least one wall, which clean room at least partially surrounds the individual moulding stations, so that the moulding stations can be moved within this clean room, and comprising a locking mechanism that is at least partially located within the clean room, which locking mechanism is used to lock the two blow mould carrier parts together in a closed condition of the blow mould, wherein the locking mechanism includes a first locking element that for locking cooperates with a second locking element, said first locking element being arranged to be movable by a moveable element and the moveable element is supported using at least one bearing that is at least partially provided outside of the clean room.

2. The apparatus as claimed in claim 1, wherein the moveable element is a pivot shaft that can be pivoted about a predefined pivot axis.

3. The apparatus as claimed in claim 1, wherein the bearing are provided on the carrier.

4. The apparatus as claimed in claim 2, wherein the moveable element is sealed against the carrier using at least one sealing unit.

5. The apparatus as claimed in claim 4, wherein the sealing unit is a shaft seal.

6. The apparatus as claimed in claim 1, wherein the carrier has a recess on the outer perimeter thereof, in which the moulding stations are arranged.

7. The apparatus as claimed in claim 1, wherein at least one locking element has at least one hole-shaped recess and the other locking element has at least one protrusion that engages in a locked condition into the hole-shaped recess.

8. The apparatus as claimed in claim 1, wherein a blow mould carrier part is provided to be stationery relative to the carrier.

9. The apparatus as claimed in claim 1, wherein the apparatus has an actuating element for moving the first locking element, and this actuating element is provided outside of the clean room.

\* \* \* \* \*